April 4, 1961  G. HULSE  2,978,376
METHOD FOR PRODUCING LAMINATED ARTICLES
Filed Jan. 29, 1957
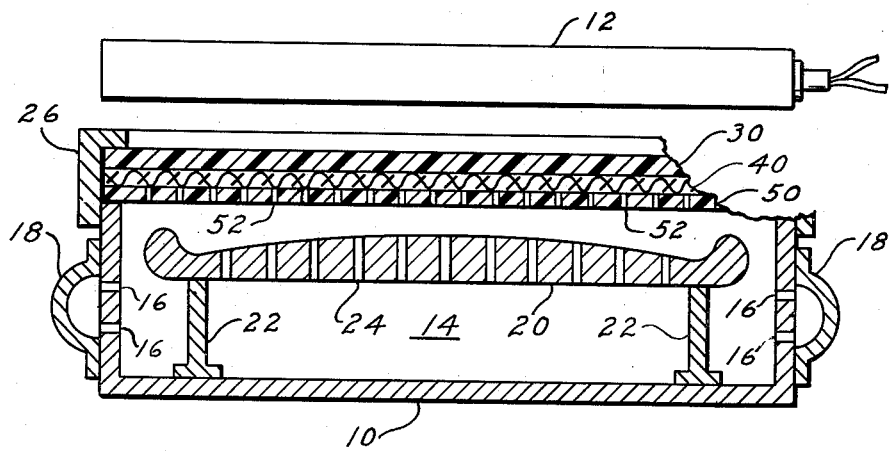
GRAHAM HULSE  INVENTOR
BY
ATTORNEY

United States Patent Office 2,978,376
Patented Apr. 4, 1961

2,978,376
METHOD FOR PRODUCING LAMINATED ARTICLES

Graham Hulse, Ickenham, Uxbridge, England, assignor to Monsanto Chemicals Limited, London, England, a British company Filed Jan. 29, 1957, Ser. No. 636,851

Claims priority, application Great Britain Feb. 3, 1956

3 Claims. (Cl. 154—110)

This invention relates to laminated articles and to their production by the vacuum forming process.

In the manufacture of articles from sheets of thermoplastic resins a laminated product can be obtained by placing between two sheets of thermoplastic resin a layer of suitable material and then bonding the whole together by heat and pressure. The resulting product can be used as a flat sheet, or it can be moulded into a simple shape by heat and pressure to provide, for instance, a seat for a chair. The use of laminates rather than single sheets of thermoplastic resin enables various effects to be achieved which cannot be done with the single sheets alone. Thus for instance an article can be made using two thermoplastic sheets of different colours, so that one surface has a colour different from that of the other.

A convenient and economical method for moulding a single sheet of a thermoplastic resin is that known as vacuum forming. In this method a sheet of the resin is clamped over a box containing a mould and softened by heating. Air is then withdrawn from the interior of the mould box and atmospheric pressure forces the heat softened sheet into the mould box and onto the mould so that it takes up the shape of the mould. The apparatus required for this moulding process is simple and convenient for small manufacturers. The present invention is concerned with the application of the process of vacuum forming to the production of laminated articles from two or more superimposed sheets of thermoplastic resin.

If the vacuum forming process is applied to two or more superimposed sheets, it is found that the presence of air between the sheets is liable to prevent those sheets other than that nearest to the mould from being drawn evenly onto the mould, with the result that there are voids between the sheets and a true laminate is not formed. To ensure that a proper laminate is obtained, the air between the sheets has therefore to be removed before they are drawn onto the mould. One way of doing this would be to place an adhesive layer between the sheets so that they are bonded together before the vacuum forming process is applied. To have to bond the sheets together in this way would be very inconvenient and it has now been found that this can be avoided very simply by perforating the sheet nearer to the mould, or if more than two sheets are used, by perforating all the sheets except the farthermost from the mould, and then carrying out the vacuum forming operation. It has been found that the perforations can be so small that they suffice for removal of the air, but do not spoil the appearance or the function of the laminated article produced.

The process of the invention is therefore one for the production of laminated articles by vacuum forming, in which two or more superimposed sheets of thermoplastic resin are used, each sheet other than the one farthest from the mould being perforated so that air can be withdrawn from between the sheets during the moulding operation.

Fig. 1 is a sectional vertical view, with parts broken, showing vacuum-forming equipment setup to produce a laminate chair seat.

Referring to the drawings, wherein like members refer to like parts throughout, vacuum-forming equipment of the usual form, is shown on which to practice the present invention. In essence, the equipment constitutes a mold box 10, over which is positioned heater 12. The mold box 10 is of unitary construction and serves to define a chamber 14. The sides of mold box 10 are provided with perforations 16—16 communicating to vacuum collar pipe 18, the latter eventually connecting into a vacuum pump, not shown. Chair mold 20, supported by uprights 22—22, is centrally located within chamber 14, and, a large number of perforations, shown magnified and partially legended as 24—24, are provided opening through, and into the face of mold 14.

Detachable clamping frame 26 is fitted over the top periphery of mold box 10. This serves to securely position the various sheets of thermoplastic material designed to be laminated; as shown, these are thermoplastic sheet 30, fabric interlayer material 40 and a second thermoplastic sheet 50, in sealed relationship over the top of chamber 14. Note that thermoplastic sheet 50, which is in the innermost position, is provided with a number of perforations, shown greatly magnified in size and partially legended as 52—52. On operation, the thermoplastic sheets 30, and 50 together with interposed fabric interlayer material 40 are drawn into chamber 14 to there contact chair mold 20 and eventually result as a laminate chair seat.

An interlayer material which does not prevent the sheet farthest from the mould from being drawn onto the mould can be inserted between two or more of the sheets of thermoplastic material before they are drawn onto the mould, and the properties of the laminated article can be improved by this means. The interlayer material can, for instance, be used to provide strengthening or decorative effects, and need not be thermoplastic. Preferably there are used two sheets of thermoplastic resin, at least one of which is transparent (the second being preferably opaque, by which is meant impenetrable to sight), and an interlayer material providing a decorative effect is placed between them so that it can be seen through the transparent layer of resin in the laminated article.

The invention thus especially relates to a vacuum formed article comprising two layers of thermoplastic resin having between them a decorative interlayer material, at least one layer of resin being transparent so that the decorative material is visible. Preferably the second layer of resin is opaque. Such an article has the very useful characteristic that it has the decorative appearance of the interlayer material while retaining the smooth and easily cleaned surface of a thermoplastic resin. Moreover the interlayer material giving the decorative appearance is protected from damage.

Thermoplastic resins which are suitable are those which can be used in the normal vacuum forming process. Examples of suitable resins are modified polystyrenes, styrene copolymers, and polyvinyl chloride. Cellulose acetate is very suitable for transparent sheets. High molecular weight polystyrene can be used in instances where the mould is very shallow. Particularly suitable resins are toughened polystyrenes, for example those containing natural or synthetic rubbers. The thermoplastic sheets can be of the same or different resins. Thus one sheet can be of transparent cellulose acetate and another of opaque polyvinyl chloride. Examples of other combinations which can be used are translucent polyvinyl chloride with opaque polyvinyl chloride, and cellulose acetate with toughened polystyrenes. The sheets used can if desired differ in thickness, one sheet for instance being sufficiently thick to provide the main strength of the laminated article and the other only thick enough to provide a surface effect, or if it is transparent, to hold a decorative interlayer material, for instance, to the thicker sheet. The thermoplastic sheets will of course be sufficiently thin for the necessary transfer of heat for softening, and the moulding process, to take place in the vacuum former. Although in practice only two sheets of thermoplastic material will usually be used, three sheets or even more can be employed, provided the necessary softening is achieved for the vacuum forming process to be carried out: difficulties in heat transfer can be overcome by preheating the sheets nearest to the mould in the vacuum former before superimposing the farthermost sheets and then heating them.

Where an interlayer material is used, its choice will depend on the properties which it is to impart to the laminate. If the interlayer material is to provide a decorative effect as described above, it can, for example, be of paper or fabric. Other decorative interlayers can be provided by metal foils, filaments of metals or of polymers, glass fibre mats or woven glass cloth. Of course an interlayer material which is delicate will not be used under such conditions that it is damaged or destroyed by the heating applied in the vacuum former. The interlayer material can be used as a reinforcing layer to give added strength to the laminate, and for this purpose wire mesh or canvas can be used. An interlayer material can be chosen which both provides a decorative effect and strengthens the laminate; for instance this can be achieved by employing a patterned fabric as interlayer material. The interlayer material need not be continuous but can be in the form of strips or other shapes, and more than one layer of material can be used provided that its combined thickness is not so great that it interferes with the formation of the laminate. If the interlayer material is continuous the material chosen should be sufficiently porous to permit the air to be withdrawn evenly from between it and the thermoplastic sheet farthermost from the mould. The interlayer material needs of course to be sufficiently flexible to allow the laminate to take up the form of the mould in the vacuum forming operation.

The perforations in the thermoplastic sheets need in practice to be small so that they do not spoil the appearance or the function of the laminated article. Suitable perforations can be made using a needle, and the position and number of the perforations will depend upon the fineness of the mould detail and the size and position of the mould cavities. The perforations are made so that the air can be drawn uniformly from all positions between the thermoplastic sheets. In some instances it may be possible for the perforations to be made in a part of the sheet or sheets which in the finished laminated article can be removed by trimming. The conventional mould box and moulds can be used in vacuum forming the laminates.

In carrying out the vacuum forming operation using two sheets of thermoplastic resin which are of different thickness, the thinner sheet is conveniently placed nearer to the mould, and is thus the perforated sheet; by taking up the pressure the thicker sheet then performs most of the work in the moulding operation. As in the normal vacuum forming process, the thermoplastic sheets are clamped around the edges of the mould box in such a way as to exclude air from entering into the interior of the box during the moulding operation. Where an interlayer material is used care will of course be taken to see that the sheets are clamped in such a way that air cannot be drawn between the edges of the thermoplastic sheets into the space between them containing the interlayer material, for otherwise the vacuum applied to the box interior will not draw the farthermost sheet.

Using two thermoplastic resin sheets and an interlayer material, one convenient method of procedure is thus as follows. One of the sheets is perforated using a needle in appropriate positions having regard to the form of the mould and is then placed on the mould box. A heater above the mould box is brought into operation and used to pre-heat the sheet to a suitable temperature after which it is turned off. The interlayer material is placed in position on the pre-heated sheet and the second sheet of thermoplastic resin is superimposed. The layers having thus been assembled, they are clamped together to the edges of the mould box and the heater is applied to the outermost sheet. When the layers have reached the correct temperature for vacuum forming, air is withdrawn from the mould box (through fine holes in the mould and sides of the mould box) until the laminate is formed with the shape required. The laminate is then allowed to cool and when it is cold enough, it is removed and its edges trimmed.

In a modification of the process which is also to be regarded as within the scope of the present invention, an unperforated thermoplastic resin sheet is vacuum formed, allowed to cool and then perforated. The second thermoplastic sheet is then vacuum formed on top of it in order to form a laminate. If necessary, this second sheet can also be perforated after it is vacuum formed and other sheets added to the laminate in the same way. Interlayer material can be inserted between the moulded sheets afterwards if desired. Thus, in this modification of the process, instead of forming the superimposed sheets simultaneously on the mould, one or more of the sheets other than that farthest from the mould is not perforated until after it has been drawn onto the mould, and any interlayer material is inserted either before or after the sheets concerned have been drawn onto the mould.

When the laminate is formed on the mould, there may or may not be bonding between the sheets of resin, and in the modification described immediately above, there will of course be none. While the terms "laminate" and "laminated article" may usually suggest the presence of bonding between the laminae, as used in this specification they are intended to include products which have unbonded laminae and which are used in a form in which the laminae are bonded or held together. The strength and position of bonding where this does occur will depend upon the shape of the mould, the nature of the resins and the temperature at which moulding takes place. For many purposes it does not matter if no bonding of the separate resin sheets takes place, so long as the laminate is during use kept together as a unit by suitable means, for instance by pressure holding the sheets together at the edges of the laminate. However, for many purposes it is convenient to ensure that sufficient bonding of the resin takes place internally for the sheets to be joined together. In instances where the conditions are such that the resin sheets do not bond together, use can be made of adhesives or bonding agents. An organic solvent for the resins which when applied to the sheets softens the surface and improves its bonding properties is often a suitable bonding agent. Resin adhesives can also be used as bonding agents.

The choice of a solvent for use as a bonding agent will depend on the resin employed. Where modified polystyrenes are concerned, ethyl acetate or acetone can be used; dioxan, acetone, ethyl lactate, methyl acetate, cyclohexanone, and tetrahydrofuran are suitable for cellulose acetate, and for polyvinyl chloride cyclohexanone or tetrahydrofuran can be employed. Where two different thermoplastic resins are used in the laminate, the solvent is chosen accordingly, and sometimes a mixture of solvents is suitable. In applying a solvent as a bonding agent it is often quite sufficient to brush part of the appropriate surface of the resin sheet with the solvent, and to carry out the vacuum forming operation before the solvent has had time to evaporate from the surface.

Synthetic resin bonding agents can be used in a similar way, and a polyvinyl acetate resin can for example be employed. Where an interlayer material is used, it may be desirable to impregnate it with a resin adhesive in order to bond it to the resin sheets on either side.

By means of this invention a wide variety of useful plastic articles can be provided, for instance plastic chair seats and chair backs having a decorative appearance, plastic furniture drawers with interior and exterior in differing colours, advertising signs and reinforced boxes for packaging.

The invention is illustrated by the following examples.

*Example 1*

This example describes the production of a laminate suitable for use as a chair seat, using a mould of plain slightly curved surface, convex towards the laminate formed on it, in a standard vacuum former box of size 24 inches by 27 inches.

A rectangle of transparent cellulose acetate sheet, $\frac{1}{32}$ inch thick and 25 inches by 28 inches was perforated with a needle in a dozen p'aces spread over its surface. It was then placed over the box of the vacuum former, and a piece of a typical furnishing fabric 23 inches by 26 inches was placed face down upon the cellulose acetate sheet. An opaque white sheet of rigid polyvinyl chloride 25 inches by 28 inches, and $\frac{1}{8}$ inch thick, was superimposed. The edges of the sheets were clamped to the box of the vacuum former and an infra-red heater held in position over the polyvinyl chloride sheet until its surface temperature as measured by the thermocouple was 150° C. (this required about 1 minute). The heater was removed and vacuum applied to form the laminate on the mould. When the laminate had cooled until it was no longer plastic, it was removed and trimmed to size. It was then ready for incorporation into a chair as the seat, the edges of the laminate being bound together when the chair was assembled.

The polyvinyl chloride sheet could be replaced by toughened polystyrene sheet to give similar results.

*Example 2*

This example describes the production of a laminate using a solvent as bonding agent for the thermoplastic sheets.

A polyvinyl chloride sheet as described in Example 1 was placed on a bench. On it was placed a piece of furnishing fabric, 18 inches square, in a central position and face upwards. A film of tetrahydrofuran was applied using a brush, to the uncovered polyvinyl chloride sheet surrounding the fabric, and immediately afterwards a perforated transparent cellulose acetate sheet as described in Example 1 was superimposed and the assembly was inverted, placed over the box of the vacuum former containing the mould described in Example 1 and clamped. The operation of heating and vacuum forming was carried out as described in Example 1. When sufficiently cool, the moulded product was removed from the former and trimmed. The plastic sheets were found to be well bonded together and the laminate could be used in the construction of a chair without binding or clamping.

What I claim is:

1. A method for producing laminated articles by a vacuum forming procedure which consists of positioning in hermetically sealed relationship on a mold box at least two sheets of thermoplastic material having interposed at least one air permeable flexible interlayer, each sheet other than the one farthest from the mold being provided with a plurality of perforations, heat softening said thermoplastic material and reducing the pressure within the mold box to less than atmospheric pressure to draw air from between the sheets and to draw the sheets into engagement with the mold.

2. A process according to claim 1 wherein said flexible interlayer constitutes an air permeable fibrous sheet of paper.

3. The process of claim 1 wherein the flexible interlayer constitutes textile fabric.

References Cited in the file of this patent

UNITED STATES PATENTS

| | | |
|---|---|---|
| 2,354,916 | Hurt | Aug. 1, 1944 |
| 2,380,775 | Meyer | July 31, 1945 |
| 2,590,221 | Stevens | Mar. 25, 1952 |
| 2,750,719 | Wandelt | June 19, 1956 |
| 2,815,309 | De Ganahl et al. | Dec. 3, 1957 |